United States Patent [19]

Trefney

[11] Patent Number: 5,046,132
[45] Date of Patent: Sep. 3, 1991

[54] OPEN FIELD TEST SITE REFERENCE ANTENNA WITH INTEGRAL BATTERY POWERED SIGNAL GENERATOR

[75] Inventor: Ralph P. Trefney, Mariposa, Calif.

[73] Assignee: C.K. Consultants, Inc., Mariposa, Calif.

[21] Appl. No.: 354,642

[22] Filed: May 19, 1989

[51] Int. Cl.⁵ .................... H04B 1/04; H04Q 11/12
[52] U.S. Cl. ..................... 455/119; 455/127; 455/129
[58] Field of Search ............ 455/91, 127, 129, 115, 455/67, 114, 119, 116; 324/202, 341

[56] References Cited

U.S. PATENT DOCUMENTS

| | | | |
|---|---|---|---|
| 3,649,909 | 3/1972 | Ort et al. | 455/115 |
| 3,794,914 | 2/1974 | Aslan | 324/95 |
| 3,877,001 | 4/1975 | Bogut et al. | 455/127 |
| 3,893,021 | 7/1975 | Meador et al. | 324/341 |
| 3,914,693 | 10/1975 | Ohlen | 455/115 |
| 4,072,899 | 2/1978 | Shimp | 324/72.5 |
| 4,088,950 | 5/1978 | Kirby | 324/95 |
| 4,207,518 | 6/1980 | Hopfer | 324/95 |
| 4,375,701 | 3/1983 | Hanson | 455/127 |
| 4,611,166 | 9/1986 | Aslan | 324/95 |
| 4,631,473 | 12/1986 | Honda | 324/72.5 |
| 4,635,296 | 1/1987 | Dinsmore | 455/127 |
| 4,642,558 | 2/1987 | Batchman et al. | 324/72.4 |
| 4,810,961 | 3/1989 | Takahashi et al. | 324/95 |
| 4,814,694 | 3/1989 | Takahashi et al. | 324/95 |

Primary Examiner—Reinhard J. Eisenzopf
Assistant Examiner—Andrew Faile
Attorney, Agent, or Firm—Townsend and Townsend

[57] ABSTRACT

A calibrator circuit for a self-contained device for vertification of open field test site accuracy. This device generates a broadband width of discrete frequencies from 10 MHz to 1000 MHz which is then radiated into space. The circuit contains a power supply subcircuit, an oscillator subcircuit which generates an output signal rich in harmonics, an antenna radiating element and a balun network to couple the output from the oscillator subcircuit to the antenna element.

16 Claims, 1 Drawing Sheet

Image 5,046,132

OPEN FIELD TEST SITE REFERENCE ANTENNA WITH INTEGRAL BATTERY POWERED SIGNAL GENERATOR

FIELD OF THE INVENTION

The present invention is related to electrical circuits which broadcast precise signals and, more particularly, to circuits used for calibrating open field site test equipment for checking electrical interference.

BACKGROUND OF THE INVENTION

By government regulation there are requirements on the amount of broadcast interference, or noise, which may be generated by electrical devices. Such regulation avoids interference of radio and television broadcasts so that communications, such as those by airports and aircraft, police and fire departments, and ordinary television and radio receivers, are not disrupted.

Thus the limitations imposed by the government (the Federal Communications Commission) are strict. The radiated noise emission limits currently cover the frequency range form 30 MHz to 1000 MHz and are controlled within plus or minus 3 dB of the established limit. The uncertainty of plus or minus 3 dB forces a recommendation that the emission signals from the electric device be at least 6 dB under the limit so that the device can pass the limitation.

Some of the uncertainty is due in part to the inaccuracies in the measurement equipment used to test electrical devices and some are due to the inaccuracies of the open field test site. The radiated noise emission tests are performed under open field conditions where the site of the test is free from obstructions and objects which might cause inaccuracies in the measurement. By description a site must be controlled so that one site behaves and performs as well as another site. Test measurement results at one site should be repeatable at another.

However, the repeatability of site measurement results or a way of verifying that the repeatability of the measurement results at another site is a problem. A more important problem is the comparison of two test site measurements. Should the results at two sites not agree, it is highly desirable to know precisely what the true differences are, say, to within 1 dB.

Thus the problem resolves to one of calibration. Up to now, the calibration of an open field site has taken a lot of expensive equipment; the task of calibration is also labor-intensive. The equipment can cost as much as $100,000; while the time required is usually about 6 hours.

The practical impact of this problem is that many electrical product manufacturers hire outside test laboratory companies to make the measurements on the manufacturer's products. This is especially true with a smaller business which cannot afford to a large investment into this type of test instrumentation. While the manufacturer may start with only one outside laboratory, the manufacturer may end with several test laboratories. Often the first laboratory will have scheduling conflicts and thus the manufacturer is forced to find other test laboratories to meet the pressure of product release deadlines and the like. For the smaller manufacturer which does not have the influence of the larger customers of the laboratory, this is a typical result.

Thus there is an established need for an approach to verify or correlate the results of test site measurements of one laboratory with the results of test site measurements of the second laboratory so that meaningful data can be collected. Without such verification or correlation the determination of whether a product meets the government criteria for electrical noise emissions remains doubtful—a highly unsatisfactory position for the product manufacturer.

The present invention solves or substantially mitigates this problem.

SUMMARY OF THE INVENTION

The present invention provides for a circuit which emits precise electrical signals over a broadband of frequencies, at least over the range of 10 MHz to 1000 MHz and is useful as a calibrator for open field site test equipment. The present invention has a power supply subcircuit and a power supply regulating subcircuit for maintaining an output voltage at a predetermined level. An oscillator subcircuit is connected to the power supply regulating subcircuit; the oscillator subcircuit output signal has a fast rise and fall time like that of square wave. A particular balun network couples the output signal from the oscillator subcircuit to an antenna element in a dipole configuration. The present invention also has a power supply monitoring subcircuit to check the condition of a battery used in the power supply subcircuit. Thus the present invention permits an easily portable unit for calibrating open field test sites and equipment.

DETAILED DESCRIPTION OF SPECIFIC EMBODIMENTS

Figure 1:
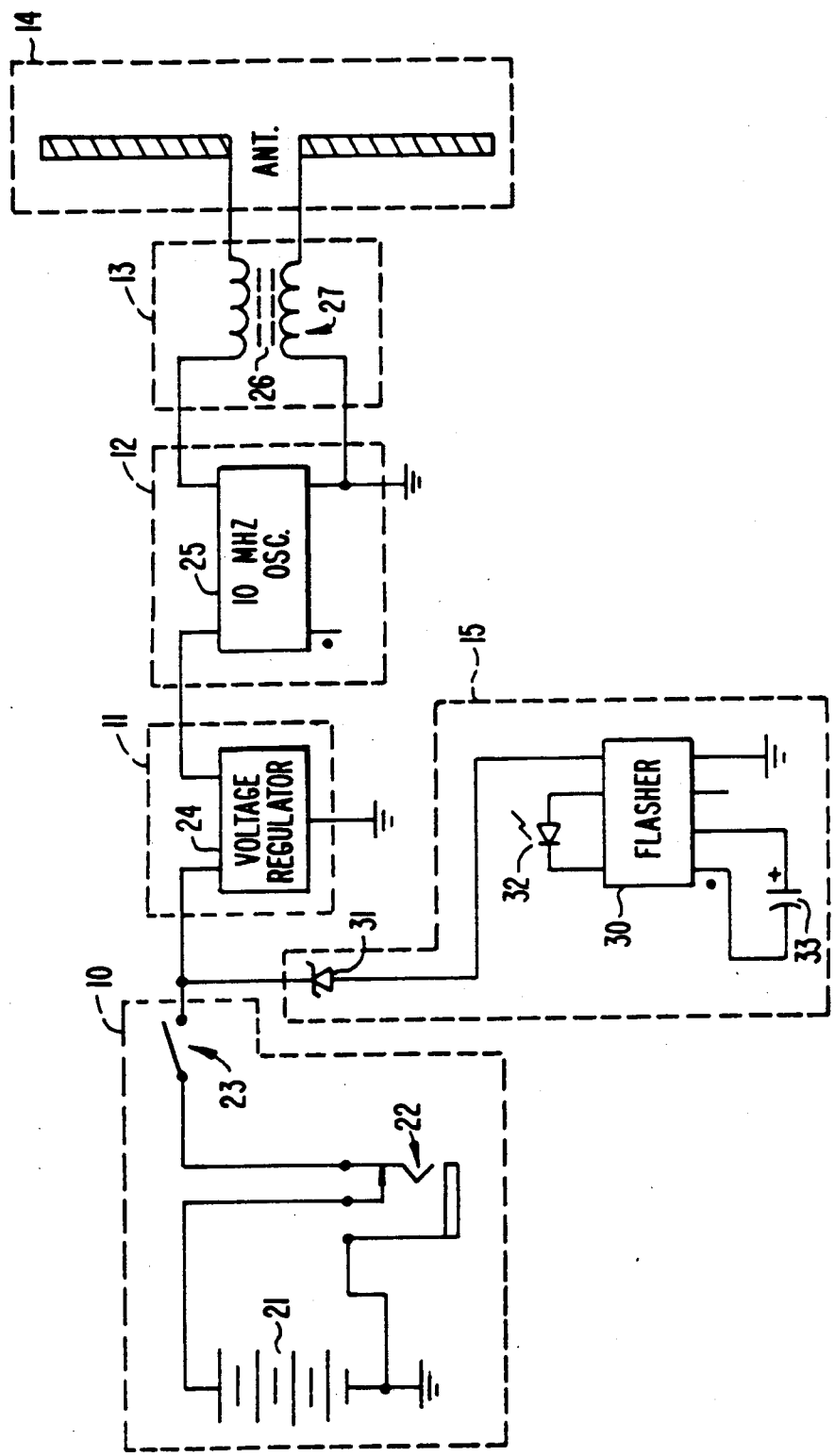
FIG. 1 is a circuit diagram of the present invention.

FIG. 1 illustrates the present invention, which allows for a totally self-contained device for verification of the results of open field test sites. This circuit of FIG. 1 generates a broadband width of discrete frequencies from 10 MHz to 1000 MHz. The circuit has a power subcircuit 10, a power supply regulating subcircuit 11, a temperature-compensated oscillator subcircuit 12, a balun network 13 to couple the output from the oscillator to the antenna, and an antenna radiating element 14. In addition the circuit in FIG. 1 has a power supply monitoring subcircuit 15.

The power supply subcircuit 10 has a battery 21 which permits the present invention to operate independently. In this case the battery 21 supplies 9 volts in full operating condition. A switch 23 connects the battery 21 to the other parts of the circuit in FIG. 1. The switch 23 simply turns the circuit off and on for operation.

To permit the power from an external power source, a jack 22 is connected in series with the battery 21. The jack 22 is useful when circuit is required for extended periods of time and the battery 21 to be saved for situations when independent power is required. The external power supply is limited to +15 volts D.C. maximum and a minimum current of 20 milliamps.

The power supply regulation subcircuit 11 is a three-terminal, voltage regulator integrated circuit 24. The integrated circuit 24 stabilizes the voltage supplied by the power supply subcircuit 10 at +5 volts. A suitable integrated circuit is a 7805 supplied by Motorola, Inc. of Schaumberg, IL.

The output from the integrated circuit 24 supplies power to a temperature-compensated, 10-MHz oscillator subcircuit 12. It is important that the oscillator subcircuit 12 have a rise and fall time of 10 nanoseconds or faster. This causes the output signal from subcircuit 12 to be rich in harmonics of the 10 MHz base frequency. This permits the present invention to radiate the broadband of frequencies from 10 MHz to 1000 MHz. Thus the sharper the rise (and fall) time of the oscillator subcircuit 12, the more the output signal approaches that of a square wave and the richer in harmonics the output signal of the subcircuit 12 becomes. A discrete, temperature-compensated, oscillator component 25 may be used for the subcircuit 12. A component with the desired characteristics is Oscillator Model No. 1100, manufactured by NDK.

The balun network 13 receives the unbalanced output signal from the oscillator subcircuit 12 and tranforms the signal into a balanced output signal. This output signal is fed into the radiating antenna element 14, which in the form of a dipole. The symmetry of a dipole requires that the input signal to the antenna element 14 be balanced so that the energy from the oscillator subcircuit 12 is fully radiated into space.

The balun network 13 has two coils 27 wound in a bifilar manner around a common ferrite core 26. One coil is connected to the output terminal of the oscillator subcircuit 12, while the other terminal is connected to the ground terminal of the subcircuit 12. The bifilar winding assures that output currents from the network 14 and generated by the oscillator subcircuit 12 flow in a common mode, but 180 degrees out of phase with each other.

The ferrite core 26 has a permeability of about 700 ($\mu_i$) so that impedance of the oscillator component 25 matches that of the dipole antenna used for the antenna element 14. In this particular embodiment the impedances are matched at about 73 ohms. Additionally, the ferrite core is composed of iron, nickel and zinc so that the network 13 can transmit the broadband of frequencies from the oscillator subcircuit 12 to the antenna element 14. Such a ferrite core is available from, for example, Tokin Co. of Tokyo, Japan. The ferrite core is identified as ESD-R-10D.

Finally, the present invention has a power supply monitoring subcircuit 15, which is used to indicate a battery "low voltage" condition. The subcircuit 15 is connected at the input terminal to the power supply regulating subcircuit 11. A 6.2-volt Zener diode 31 has its cathode connected the input terminal. When the switch 23 is turned on, the Zener diode 31 reduces the voltage available from the 9-volt battery 21 to 2.8 volts. The 2.8 volts is then used to power the rest of the power supply monitoring subcircuit 15 in the form of a modified flasher integrated circuit 30. The anode of the Zener diode 31 is connected to an input terminal of the flasher circuit 30, an LM3909 integrated circuit supplied by Signetics Corporation of Sunnyvale, CA. The output terminals of the integrated circuit 30 are connected to an LED (light-emitting diode) 32. When the battery is at the full 9-volt level, the integrated circuit flashes the diode 32 at a 3 Hz rate. This flashing rate is set by the capacitor 33 which has a capacitance of 220 microFarads. When the battery 21 declines to an 8-volt level, the LED 32 begins to flash at a 1 Hz rate. When the battery 21 declines further below a 7-volt level, the LED 31 no longer flashes. At this voltage level the voltage regulator 25 used in the subcircuit 11 is no longer supplied with sufficient voltage to its output voltage at the desired +5 volts.

Thus the present invention permits the realization of a compact, self-contained unit for calibrating open field test site equipment and verifying the accuracy of the test sites. The circuit of FIG. 1 has been implemented within a pipe having a length of approximately 42 inches and a diameter of 2 inches—a size which permits easy transportation from one test site to another, although a wide range of sizes and shapes could be selected. In operation the circuit emits relatively precise and unvarying signals over the broadband of frequencies used to check for electrical interference.

Thus while the description above provides a full and complete disclosure of the preferred embodiments of the present invention, various modifications, alternate constructions and equivalents may be employed without departing from the true scope and spirit of the invention. For example, most of the separate units of the present invention may be designed into a single integrated circuit. Therefore, the present invention should be limited only by the metes and bounds of the appended claims.

What is claimed is:

1. A circuit for emitting precise and unvarying electrical signals over a broadband range of frequencies, comprising:
    an antenna element for radiating said signals over said broadband of frequencies;
    a power supply subcircuit;
    a voltage regulating subcircuit coupled to said power supply subcircuit;
    an oscillator subcircuit, having an output signal with a rise time faster than 10 nanoseconds to emit said broadband range of frequencies, coupled to said voltage regulating subcircuit; and
    a balun network coupling said oscillator subcircuit to said antenna element.

2. A circuit for emitting precise and unvarying electrical signals over a broadband range of frequencies, comprising:
    an antenna element for radiating said signals over said broadband of frequencies;
    a power supply subcircuit;
    a voltage regulating subcircuit coupled to said power supply subcircuit;
    an oscillator subcircuit having an output signal with a rise time faster than 10 nanoseconds coupled to said voltage regulating subcircuit; and
    a balun network coupling said oscillator subcircuit to said antenna element.

3. A circuit as in claim 2 wherein said output signal of said oscillator subcircuit has a fall time substantially equal to said rise time.

4. A circuit as in claim 3 wherein said output signal of said oscillator subcircuit is substantially a square wave.

5. A circuit as in claim 2 wherein said balun network comprises a pair of coils wound in a bifilar manner around a core material.

6. A circuit as in claim 5 wherein said core material has a magnetic permeability so to impedance match said oscillator subcircuit with said antenna element.

7. A circuit as in claim 6 wherein said core material has a permeability of approximately $700\mu_i$.

8. A circuit as in claim 5 wherein said core material is selected so that said balun network can transmit a broadband of frequencies from said oscillator subcircuit to said antenna element.

9. A circuit as in claim 8 wherein said broadband of frequencies has a range of at least 10 MHz to 1000 MHz.

10. A circuit as in claim 9 wherein said core material comprises iron, nickel and zinc.

11. A circuit as in claim 2 wherein said antenna element is in the form of a dipole.

12. A circuit as in claim 2 wherein said power supply subcircuit comprises a battery.

13. A circuit as in claim 12 wherein said power supply subcircuit comprises a jack for connection to an external power supply to provide an alternate power source to said battery.

14. A circuit as in claim 12 further comprising a power supply monitoring subcircuit coupled to an input terminal of said voltage regulating subcircuit said power supply monitoring subcircuit monitoring said power supply subcircuit.

15. A circuit as in claim 14 wherein said power supply monitoring subcircuit indicates when said power supply subcircuit falls below a predetermined output voltage level.

16. A circuit as in claim 14 wherein said power supply monitoring subcircuit has an LED, said LED flashing to indicate the state of said power supply subcircuit output voltage level.

* * * * *